United States Patent
Depoutovitch et al.

(10) Patent No.: US 10,783,009 B2
(45) Date of Patent: Sep. 22, 2020

(54) SYSTEMS AND METHODS FOR DYNAMICALLY SWITCHING SYNCHRONIZATION STRATEGIES FOR ACCESSING DATA STRUCTURES

(71) Applicant: Huawei Technologies Co., Ltd., Shenzhen (CN)

(72) Inventors: Alexandre Depoutovitch, Toronto (CA); Per-Ake Larson, Etobicoke (CA); Cong Guo, Waterloo (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 15/958,596

(22) Filed: Apr. 20, 2018

(65) Prior Publication Data
US 2019/0324823 A1    Oct. 24, 2019

(51) Int. Cl.
*G06F 9/52* (2006.01)
*G06F 9/48* (2006.01)
*G06F 16/901* (2019.01)

(52) U.S. Cl.
CPC .......... *G06F 9/52* (2013.01); *G06F 9/4881* (2013.01); *G06F 16/9014* (2019.01)

(58) Field of Classification Search
CPC .... G06F 16/3344; G06F 40/196; G06F 40/30; G06F 40/295; G06F 16/951; G06F 16/338; G06F 9/52; G06F 16/9014; G06F 9/4881; G06F 9/5083; G06F 16/2255; G06F 16/2322
See application file for complete search history.

(56) References Cited

U.S. PATENT DOCUMENTS

| | | | |
|---|---|---|---|
| 6,988,180 B2 | 1/2006 | Kadatch | |
| 7,287,131 B1 | 10/2007 | Martin et al. | |
| 2004/0225742 A1* | 11/2004 | Loaiza | G06F 9/526 709/229 |
| 2005/0022047 A1* | 1/2005 | Chandrasekaran | G06F 16/2343 714/5.11 |
| 2010/0306222 A1* | 12/2010 | Freedman | G06F 16/9027 707/759 |
| 2010/0306266 A1* | 12/2010 | Little | G06F 9/466 707/781 |
| 2012/0239372 A1 | 9/2012 | Kruus | |
| 2012/0323972 A1* | 12/2012 | Ostrovsky | G06F 16/9014 707/803 |
| 2013/0138896 A1 | 5/2013 | McKenney | |
| 2015/0248452 A1 | 9/2015 | Dillenberger et al. | |

(Continued)

OTHER PUBLICATIONS

Intel Corporation, "Threading Building Blocks," 2017. [Online]. Available: http://www.threadingbuildingblocks.org, retrieved on Apr. 23, 2018.

(Continued)

*Primary Examiner* — Cam Y T Truong
(74) *Attorney, Agent, or Firm* — Slater Matsil, LLP

(57) ABSTRACT

Systems and methods for switching a data access synchronization strategy for a data structure are provided. Workload characteristics of one or more threads of execution access the data structure are monitored. A target data access synchronization strategy is determined. If the current strategy is different than the target strategy, the current strategy is switched to the target data access synchronization strategy for the data structure.

18 Claims, 6 Drawing Sheets

(56) References Cited

U.S. PATENT DOCUMENTS

2015/0286586 A1* 10/2015 Yadav .................... G06F 9/528
                                                        711/152
2016/0335117 A1* 11/2016 Kogan .................... G06F 9/467
2017/0003900 A1*  1/2017 Falco ..................... G06F 3/067
2017/0075720 A1   3/2017 Kogan et al.
2018/0341596 A1* 11/2018 Teotia ................ G06F 12/1018

OTHER PUBLICATIONS

Shalev et al., Split-ordered lists: Lock-free extensible hash tables. Journal of the ACM, May 2006, pp. 379-405. vol. 53, No. 3.
Michael, Maged M. "High performance dynamic lock-free hash tables and list-based sets." Proceedings of the fourteenth annual ACM symposium on Parallel algorithms and architectures. ACM, 2002.

* cited by examiner

SYSTEMS AND METHODS FOR DYNAMICALLY SWITCHING SYNCHRONIZATION STRATEGIES FOR ACCESSING DATA STRUCTURES

FIELD

The present application relates to data access and storage, and in particular to synchronization strategies for accessing data structures.

BACKGROUND

Data is often stored on physical computer-readable storage as an organized collection of data, commonly referred to as a data structure. Often, multiple threads of execution attempt to access the same data structure. Data structures are accessed in accordance with data access algorithms. Data access algorithms may use synchronization strategies to prevent data corruption because allowing multiple execution threads to concurrently access a data structure using different synchronization strategies may corrupt data stored in the data structure or may result in incorrect data being read from the data structure.

SUMMARY

In accordance with one aspect of the invention, there is provided a method of switching a data access synchronization strategy for a data structure stored in a memory of a computing system, the method comprising: monitoring workload characteristics of one or more threads of execution accessing the data structure; determining a target data access synchronization strategy for the data structure based on the workload characteristics; and after determining that a current data access synchronization strategy for the data structure is different than the target data access synchronization strategy, switching the current data access synchronization strategy for the data structure to the target data access synchronization strategy.

In any of the preceding embodiments, switching comprises: notifying all of the one or more threads of execution to access the data structure using both the target data access synchronization strategy and the current data access synchronization strategy; and after determining that all of the one or more threads of execution are accessing the data structure using both the target data access synchronization strategy and the current data access synchronization strategy, notifying, by computing system, all of the one or more threads of execution to access the data structure using only the target data access synchronization strategy.

In any of the preceding embodiments, determining that all of the threads of execution are accessing the data structure using both the target data access synchronization strategy and the current data access synchronization strategy comprises: during a current epoch, determining, for a previous epoch, whether any one of the one or more threads of execution are accessing the data structure using only the current data synchronization strategy; and after determining, for the previous epoch, that none of the one or more threads execution are accessing the data structure using only the current data access synchronization strategy, determining that all of the one or more threads of execution are accessing the data structure using both the target data access synchronization strategy and the current data access synchronization strategy.

In any of the preceding embodiments, determining, that all of the threads of execution are accessing the data structure using both the target data access synchronization strategy and the current data access synchronization strategy comprises: assigning to each thread of execution a local epoch counter; recording a value of a global epoch counter; assigning, for each thread of execution, a value of the global epoch counter to the local epoch counter at time of each access of the data structure by the execution thread; for each thread of execution accessing the data structure, determining whether a value of the local epoch counter associated with all the one or more threads of execution equals the value of the global epoch counter; after determining that the value of all local epoch counters associated with threads of execution accessing the data structure are equal to the current value of the global epoch counter, incrementing the value of the global epoch counter; determining whether difference between the value of the global epoch counter and the recorded value of the global epoch counter is greater than a threshold; after determining that difference between the value of the global epoch counter and the recorded value of the global epoch counter is greater than the threshold; determining that all of the one or more threads of execution are accessing the data structure using both the target data access synchronization strategy and the current data access synchronization strategy.

In any of the preceding embodiments, the data structure is a hash table, a linked list, a queue, a search tree, a B-tree, or a skip list.

In any of the preceding embodiments, the current data access synchronization strategy is a lock-free strategy and the target data access synchronization strategy is a lock-based strategy.

In any of the preceding embodiments, the current data access synchronization strategy is a lock-based strategy and the target data access synchronization strategy is a lock-free strategy.

In any of the preceding embodiments, the workload characteristics include at least one of a frequency of accesses to the data structure, a ratio of read-only to write accesses to the data structure, a number of elements in a working data set, and a number of data items in the data structure.

In any of the preceding embodiments, determining the target data access synchronization strategy is further based on an operation to be performed on the data structure.

In any of the preceding embodiments, the data structure is a hash table, and the operation to be performed on the data structure is a resizing of the hash table.

In accordance with another aspect, there is provided a computing system comprising: a processor; a memory storing computer-readable instructions, which when executed by the processor, cause the computing system to: monitor workload characteristics of one or more of the threads of execution accessing a data structure; determine a target data access synchronization strategy for the data structure based on the workload characteristics; and after determining that a current data access synchronization strategy for the data structure is different than the target data access synchronization strategy, switch the current data access synchronization strategy to the target data access synchronization strategy.

In any of the preceding embodiments, the computer-readable instructions, when executed by the processor, cause the computing system to switch the current data access synchronization strategy to the target data access synchronization strategy by: notifying all of the one or more threads of execution to access the data structure using both the target data access synchronization strategy and the current data access synchronization strategy; and after determining that all of the one or more threads of execution are accessing the data structure using both the target data access synchronization strategy and the current data access synchronization strategy, notifying all of the one or more threads of execution to access the data structure using only the target data access synchronization strategy.

In any of the preceding embodiments, determining that all of the one or more threads are accessing the data structure using both the target data access synchronization strategy and the current data access synchronization strategy comprises: during a current epoch, determining, for a previous epoch, whether any one of the one or more threads of execution are accessing the data structure using only the current data synchronization strategy; and after determining, for the previous epoch, that none of the one or more threads execution are accessing the data structure using only the current data access synchronization strategy, determining that all of the one or more threads of execution are accessing the data structure using both the target data access synchronization strategy and the current data access synchronization strategy.

In any of the preceding embodiments, switching comprises: assigning to each thread of execution a local epoch counter; recording a value of a global epoch counter; assigning, for each thread of execution, a value of the global epoch counter to the local epoch counter at time of each access of the data structure by the execution thread; for each thread of execution accessing the data structure, determining whether a value of the local epoch counter associated with all the one or more threads of execution equals the value of the global epoch counter; after determining that the value of all local epoch counters associated with threads of execution accessing the data structure are equal to the current value of the global epoch counter, incrementing the value of the global epoch; determining whether a difference between the value of the global epoch counter and the recorded value of the global epoch counter is greater than a threshold; after determining that difference between the value of the global epoch counter and the recorded value of the global epoch counter is greater than the threshold; determining that all of the one or more threads of execution are accessing the data structure using both the target data access synchronization strategy and the current data access synchronization strategy.

In any of the preceding embodiments, the data structure is a hash table, a queue, a search tree, a linked list, a B-tree, or a skip list.

In any of the preceding embodiments, the current data access synchronization strategy is a lock-free strategy and the target data access synchronization strategy is a lock-based strategy.

In any of the preceding embodiments, the current data access synchronization strategy is a lock-based strategy and the target data access synchronization strategy is a lock-free strategy.

In any of the preceding embodiments, the workload characteristics include at least one of a frequency of accesses to the data structure, a ratio of read-only to write accesses to the data structure, a number of elements in a working data set, a number of data items in the data structure.

In any of the preceding embodiments, the computer-readable instructions, when executed by the processor, cause the computing system to determine the target data access synchronization strategy based on an operation to be performed on the data structure.

In accordance with another aspect, there is provided a non-transitory computer-readable medium storing computer-readable instructions, which when executed by a processor of a computing system, cause the computing system to: monitor workload characteristics of one or more threads of execution accessing the data structure; determine a target data access synchronization strategy for the data structure based on the workload characteristics; and after determining that a current data access synchronization strategy for the data structure is different than the target data access synchronization strategy, switch the current data access synchronization strategy to the target data access synchronization strategy.

These figures depict aspects of example embodiments for illustrative purposes.

DETAILED DESCRIPTION

The present disclosure generally relates to a method and computing system for dynamically switching or changing data access synchronization strategies for data structures at run time.

Figure 1:
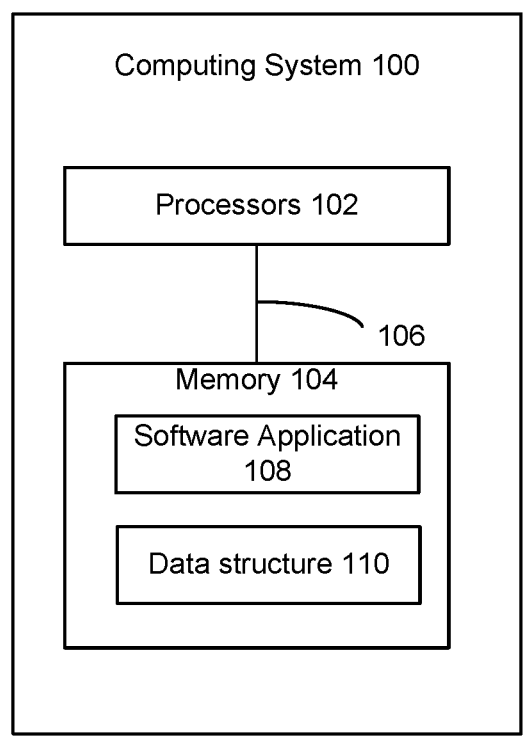
FIG. 1 is a block diagram depicting components of an example computing system.

FIG. 1 is a block diagram depicting components of an example computing system 100 in accordance with an embodiment of the present disclosure. Computing system 100 (referred to hereinafter as system 100) includes one or more processors 102 (generally referred to as processor 102 and collectively referred to as processors 102) and a memory 104. Each processor 102 is coupled to and interacts with memory 104 via a memory bus 106.

Each processor 102 may be any suitable type of central processing unit (CPU) implemented, for example, using an ARM or x86 instruction set. Memory 104 includes any suitable type of system memory that is readable by each processor 102, such as static random access memory (SRAM), dynamic random access memory (DRAM), synchronous DRAM (SDRAM), read-only memory (ROM), or a combination thereof. Memory 104 may include more than one type of memory, such as ROM for use at boot-up, and DRAM for storing one or more software applications 108 (referred to generically a software application 108 and collectively as software applications 108 hereinafter) and data for use while executing software applications 108.

Memory 104 stores software applications 108 and one or more data structures 110 (referred to generically as data structure 110 and collectively as data structures 110) associated with software applications 108. For the purposes of simplicity, the examples described herein depict one data structure 110 associated with one software application 108. However, in some embodiments, one data structure 110 may be associated with multiple software applications 108 or multiple data structures 110 may be associated with one software application 108.

Software application 108 may include any suitable software application which may access data structure 110, including but not limited to an operating system, a database application, a web service application, a word processing application, or the like. Data structure 110 organizes and stores data which are processed by processor 102. Software application 108 generates a workload, which can be broadly defined as a set of operations that is performed on the data of the data structure 110.

Although FIG. 1 depicts a standalone computing system, in some embodiments, computing system 100 may be resident in a data center. A data center, as will be understood in the art, is a collection of computing resources (typically in the form of servers) that can used as a collective computing and storage resource. Within a data center, a plurality of servers can be connected together to provide a computing resource pool upon which virtualized entities can be instantiated. Data centers can be interconnected with each other to form networks consisting of pools of computing and storage resources connectivity to each other by connectivity resources. The connectivity resources may take the form of physical connections, such as Ethernet or optical communication links, or logical connections. In some other embodiments, computing system 100 may be a distributed computing system in which processors 102 and memory 104 are distributed among a plurality of computing devices on local and/or wide area networks.

The operation of software application 108 can be defined in terms of threads of execution. Threads of execution (also referred to as execution threads) are sequences of instructions which perform functions of software application 108. Execution threads generate a workload which is a collection of all operations (e.g. read, write, modify) performed by the execution threads on data items of data structure 110 to carry out the functions of software application 108. A workload accesses data structure 110 in accordance with data access algorithms, which use data access synchronization strategies to prevent data corruption. For example, data access synchronization strategies prevent data corruption that may arise when partially modified data is read from data structure 110, or two execution threads modify data stored in data structure 110 at the same time.

Data access synchronization strategies may include lock-based and lock-free strategies. In lock-based strategies, an execution thread acquires a lock, which enforces limits on concurrent access to and modification of data structure 110. Lock-based data access synchronization strategies may be useful when, for example, an execution thread accesses a data structure to modify data items stored in data structure 110, while a different execution thread accesses data structure 110 to read the data items stored in data structure 110. However, the use of a lock-based strategy may result in increased overhead for accessing data structure 110, and possible bottlenecks when multiple execution threads require access to the same resource. In lock-free strategies, multiple execution threads can access data structure 110 at the same time without acquiring a lock. Lock-free strategies may be useful, for example, in situations where a number of read-only operations on a data structure 110 is relatively high with respect to a number of write operations because the overhead for accessing the data structure 110 is reduced and the possibility of collisions (e.g. when multiple execution threads are modifying the same data items at the same time) or synchronization errors (e.g. when an execution thread obtains an incorrect results because the multiple execution threads are updating the data structure at the same time).

The performance of lock-based and lock-free data synchronization strategies varies with characteristics of the workloads accessing data structure 110, as well as with the type of data structure 110 the workload is accessing. Workload characteristics may include, for example, a frequency of accesses to data structure 110, a ratio of read-only to write accesses to data structure 110, a number of elements in a working data set (e.g. the subset of data items in data structure 110 which are regularly accessed by the workload), and a total number of data items in data structure 110.

For example, if data structure 110 is a hash table, performance (e.g. a time it takes to perform an operation (add, remove, find, modify, or the like) on a data item stored in the hash table, as measured in operations per second) is significantly increased as the ratio of read-only to write operations increases when using a lock-free strategy. Contrastingly, the performance of a lock-based data access strategy is much less sensitive to a ratio of read-only to write operations. Likewise, with a write-heavy workload, performance degrades as a number of data items in a working data set increases when using a lock-free strategy, whereas performance of a lock-based strategy may increase as the number of elements in the working data set increases.

A data access synchronization strategy for data structure 110 is currently implemented by a software developer at the time of designing software application 108 and cannot be altered at run-time. As such, software developers are required to anticipate the most likely characteristics of the workload that would be generated by software application 108 when choosing the data access synchronization strategy for data structure 110. Any subsequent deviations in expected workload characteristics consequently may result in possible performance degradation (e.g. an increase in an average time an execution thread takes to execute operations on data structure 110).

Figure 2:
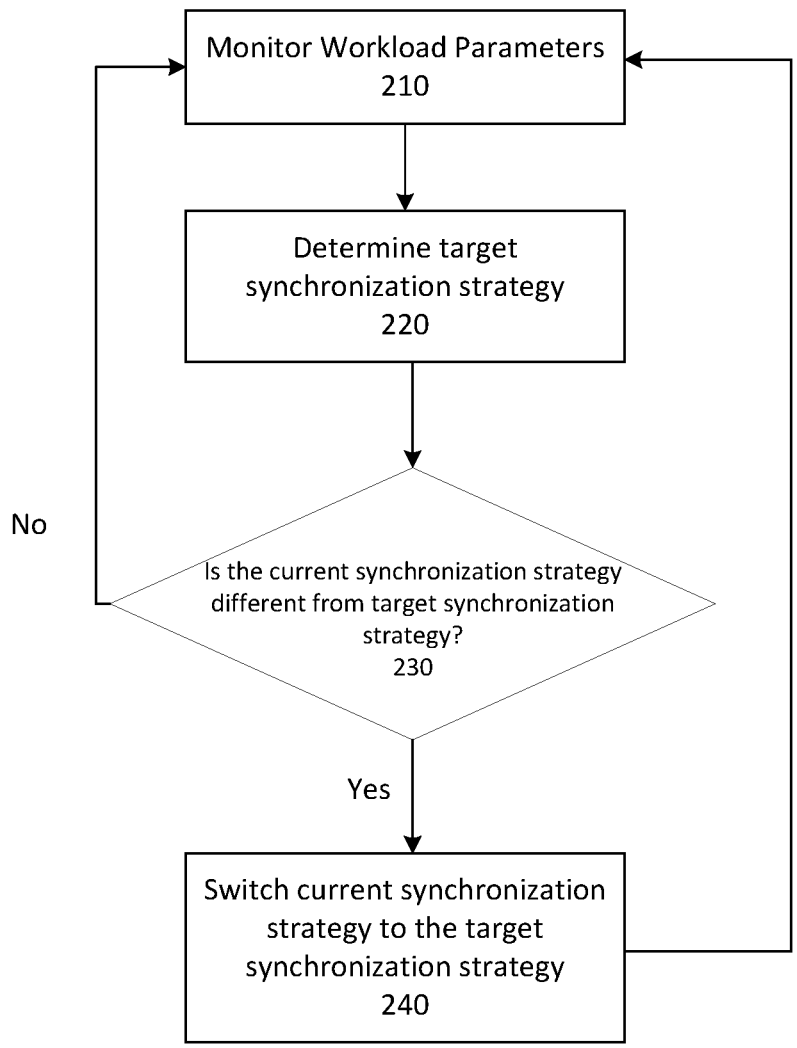
FIG. 2 is a flow chart depicting an example method for switching or changing data access synchronization strategies for accessing a data structure at run time.

FIG. 2 is a flow chart depicting an example method 200 for switching or changing data access synchronization strategies for a data structure 100 at run time in accordance with an embodiment. Method 200 may be carried out by software (e.g. a software program) executed, for example, by processor 102 of computing system 100. Coding of software for carrying out method 200 is within the scope of a person skilled in the art given the present disclosure. Computer-readable code or instructions executable by processor 102 of computing system 100 to perform or carry out method 200 may be stored in a non-transitory computer-readable storage medium, device, or apparatus, such as for example memory 104.

It is to be emphasized that method 200 need not be performed in the exact sequence as shown, unless otherwise indicated; and likewise various blocks may be performed in parallel rather than in sequence; hence the elements of method 200 are referred to herein as "blocks" rather than "steps".

At block 210, method 200 monitors the workload characteristics of one or more execution threads accessing data structure 110. Data structure 110 may be, for example, a hash table, a linked list, a queue, a search tree, a B-tree, a skip list, or the like. Workload characteristics may include, for example, a frequency of accesses to data structure 110, a ratio of read-only to write accesses to data structure 110, a number of elements in a working data set, and a total number of data items in the data structure 110.

At block 220, system 100 determines a target data access synchronization strategy based on the workload characteristics. In some embodiments, the target data access synchronization strategy is a lock-based strategy. In some embodiments, the target data access synchronization strategy is a lock-free strategy. For example, when the workload characteristics indicate a read-only workload with a low number of data items in the working data set relative to the total number of data items in data structure 110, method 200 may determine the target data access synchronization strategy is a lock-free strategy. For example, the target data access synchronization strategy may be a lock-based strategy when a number of write operations per second exceeds a threshold, or a lock-free strategy when a number of write operations per second is below the threshold. The target data access synchronization strategy may further be based on an operation to be performed on data structure 110. For example, if data structure 110 is a hash table and the operation to be performed on data structure 110 is a hash table re-size, method 200 may determine that using a lock-based strategy is the target data access synchronization strategy.

At block 230, method 200 determines whether the current data access synchronization strategy is different from the target data access synchronization strategy. If method 200 determines that the current data access synchronization strategy is the same as the target data access synchronization strategy, method 200 returns to block 210 and continues monitoring workload characteristics. If method 200 determines that the current data access synchronization strategy is different from the target data access synchronization strategy, method 200 proceeds to block 240, where method 200 switches or changes the data access synchronization strategy from the current data access synchronization strategy to the target data access synchronization strategy. For example, if the current strategy is a lock-free strategy, method 200 switches the data access synchronization strategy from the lock-free strategy to a lock-based strategy. Alternatively, if the current data access synchronization strategy is a lock-based strategy, method 200 switches or changes from the lock-based strategy to a lock-free strategy.

Figure 3:
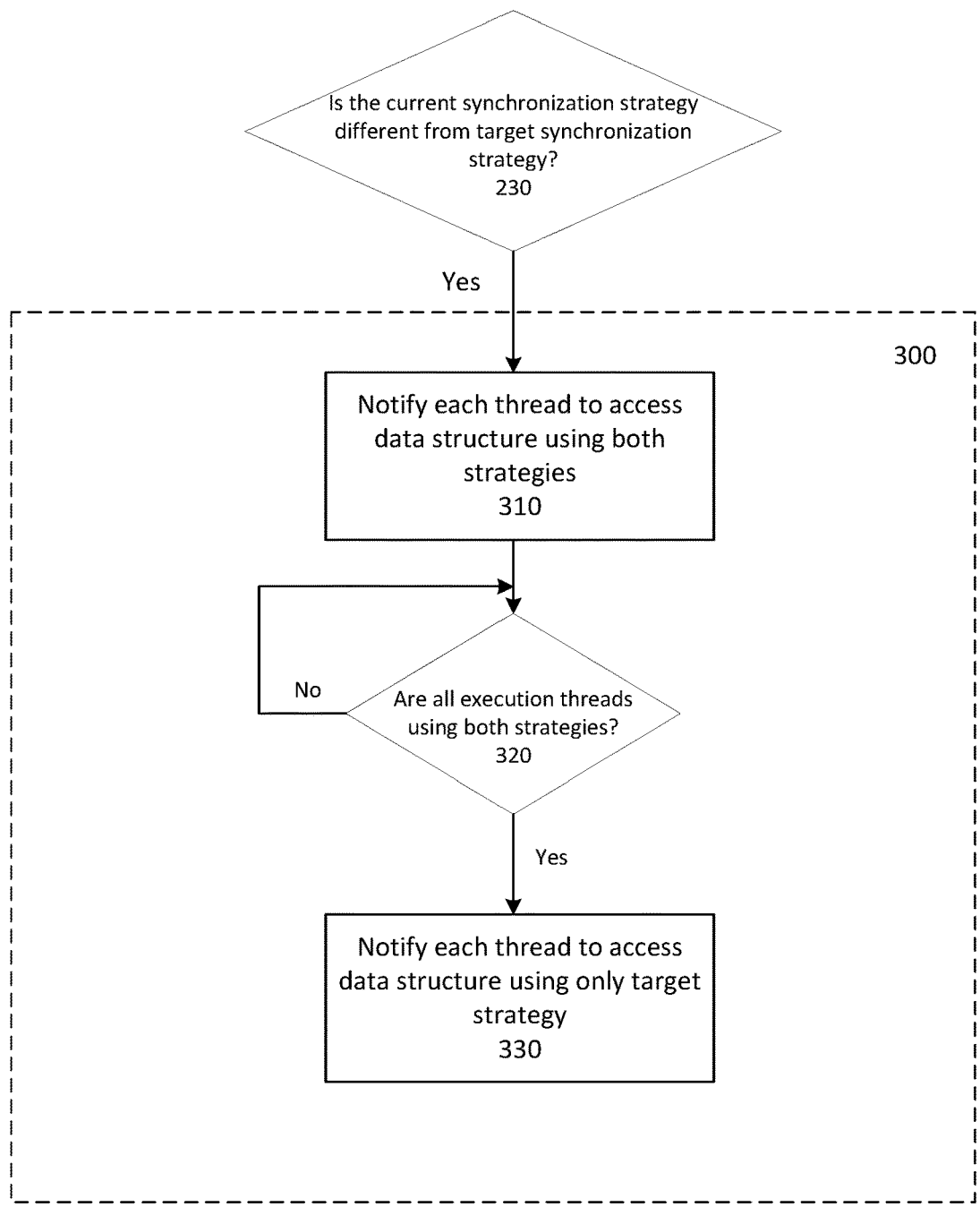
FIG. 3 is a flow chart depicting an example method of switching or changing from a current data access synchronization strategy to a target data access synchronization strategy.

FIG. 3 is a flow chart depicting an example method 300 of switching or changing from the current data access synchronization strategy to the target data access synchronization strategy in accordance with an embodiment. In some embodiments, method 300 is an expanded view of block 240 from FIG. 2.

At block 310, method 300 notifies each execution thread to begin accessing data structure 110 using both the current data access synchronization strategy and the target data access synchronization strategy. For example, if the current and target synchronization strategy are one of a lock-free and lock-based strategies, to access data structure 110 using both the current data access synchronization strategy and the target data access synchronization strategy, an execution thread must first acquire a lock to access data structure 110 and access data structure 110 using the lock-free strategy while in possession of the lock. In some embodiments, method 300 may notify each execution thread to begin accessing the data structure 110 using both the current data access synchronization strategy and the target data access synchronization strategy by setting a "strategy change" flag when method 200 determines that the current data access synchronization strategy is different from the target data access synchronization strategy.

At block 320, method 300 determines whether all execution threads have begun accessing data structure 110 using both the current and target data access synchronization strategies. If method 300 determines that not all execution thread are using both strategies, then method 300 waits and subsequently performs block 320 again. If method 300 determines that every execution thread (e.g. all execution threads) is using both the current and target data access synchronization strategies, then at block 330, method 300 notifies each execution thread to access data structure 110 using only the target data access synchronization strategy and not the current data access synchronization strategy. Method 300 may notify each execution thread to access data structure 110 using only the target data access synchronization strategy by clearing a "strategy change" flag.

Figure 4:
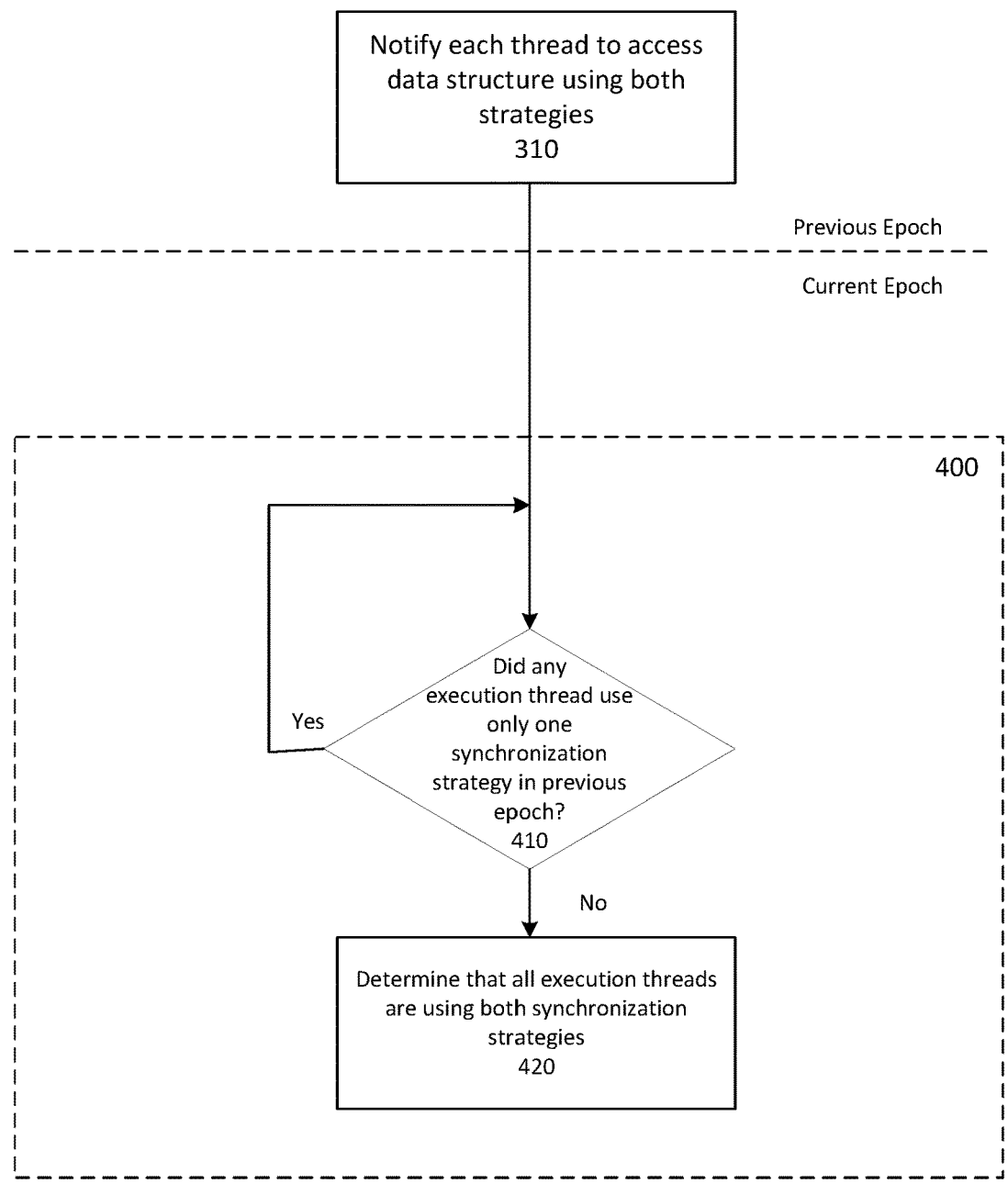
FIG. 4 is a flow chart depicting an example method of determining whether every execution thread is accessing the data structure using both the current and target data access synchronization strategies.

FIG. 4 is a flow chart depicting an example method 400 of determining whether every execution thread is accessing data structure 110 using both the current and target data access synchronization strategies in accordance with an embodiment. In some embodiments, method 400 can be implemented to perform block 320 in FIG. 3.

As depicted, after each execution thread is notified to begin accessing data structure 110 using both the current and target data access synchronization strategies, an epoch system is used to keep track of operations of different execution threads. In some embodiments, a global epoch counter is initialized. The global epoch counter can be incremented, for example by 1, to signify the beginning of a subsequent epoch over the current epoch.

At block 410, method 400 checks if any execution threads used only one data access synchronization strategy in the previous epoch. If any of the execution threads used only one data access synchronization strategy in the previous epoch, then this implies that not every execution thread has begun using both the current and target data access synchronization strategies. If none of the execution threads used only one data access synchronization strategy in the previous epoch, then method 400 proceeds to block 420. At block 420, method 400 determines that all execution threads are accessing the data structure 110 using both the current and target synchronization strategies.

Figure 5:
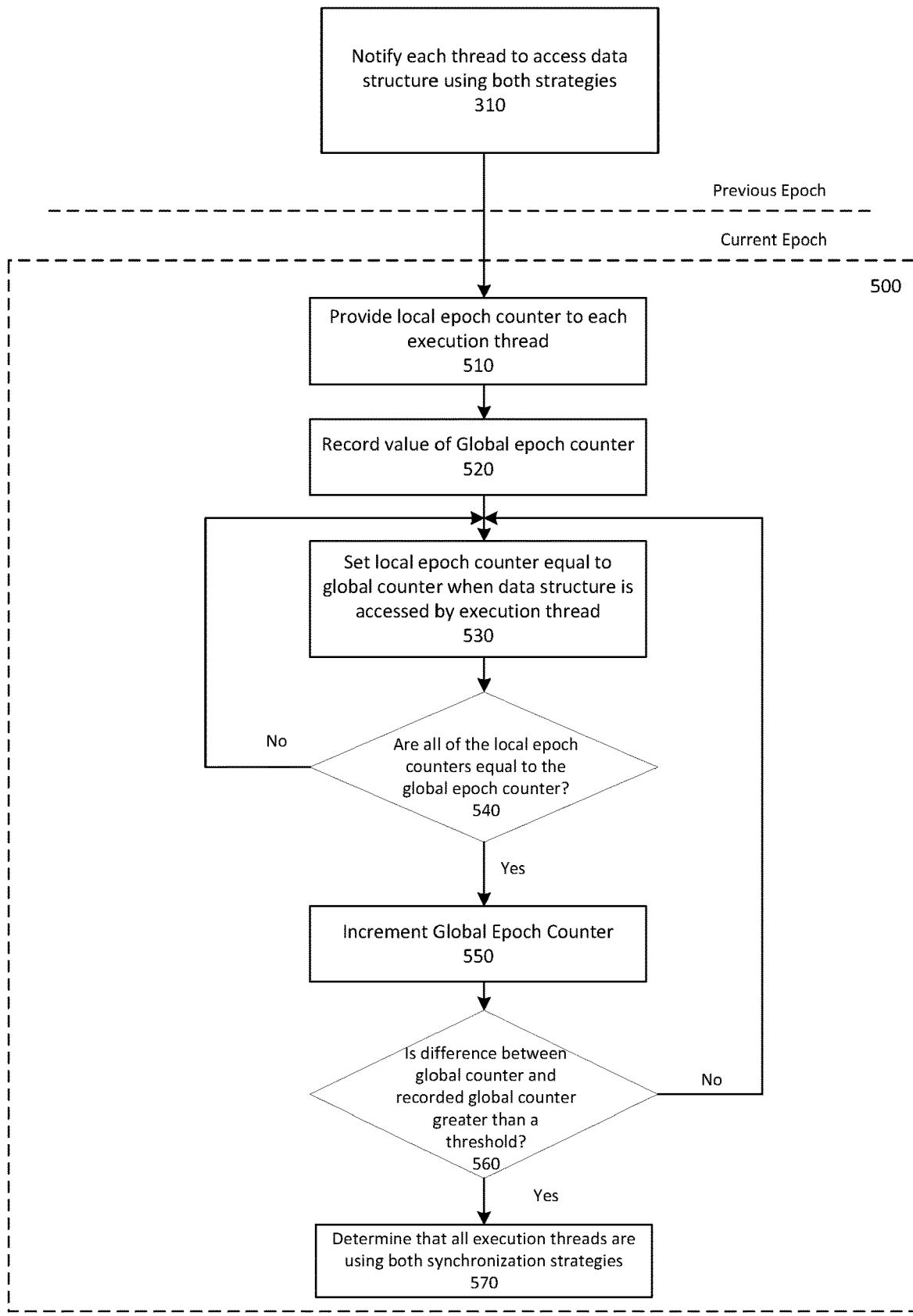
FIG. 5 is a flow chart depicting an example method of determining whether every execution thread is accessing the data structure using both the current and target data access synchronization strategies.

FIG. 5 is a flow chart depicting an example method 500 of determining whether every execution thread is accessing data structure 110 using both the current and target data access synchronization strategies in accordance with an embodiment. In some embodiments, method 500 can be implemented to perform block 320 of FIG. 3.

At block 510, a local epoch counter is provided for each execution thread, in addition to the global epoch counter. At block 520, the value of the global epoch counter is recorded. The recorded global epoch memory may be, for example, stored in memory associated with software application 108. At block 530, any time data structure 110 is accessed by an execution thread, the local epoch counter for that execution thread is set to a value equal to the current global epoch counter. In some embodiments, at block 530 the execution thread accessing data structure 110 sets an "active" flag when accessing data structure 110 and clears the "active" flag when finished accessing data structure 110. Block 530 may take place multiple times as different execution threads associated with software application 108 access data structure 110.

At block 540, method 500 determines whether all of the local epoch counters are equal to the current global epoch counter. If any of the execution threads accessing data structure 110 at the time of the check have local epoch counters which are not equal with the current global epoch counter, this implies that those execution threads might not be using both the current data access synchronization strategy and the target data access synchronization strategy. As such, when any of the execution threads have local epoch counters which do not equal the current global epoch counter, method 500 continues setting local epoch counters equal to the current global epoch counter as data structure 110 is accessed by different execution threads at block 530.

Once all of the local epoch counters for each execution thread accessing data structure 110 at the time of the check are equal to the current global epoch counter, the global epoch counter is incremented at block 550. In some embodiments, the global epoch counter is incremented by 1. A person skilled in the art will appreciate that the quantum of the increment may be any suitable amount.

At block 560, the current global epoch counter is compared to the global epoch counter which was recorded at block 520. If the difference between the current global epoch counter and the recorded global epoch counter does not exceed a threshold amount, then method 500 returns to block 530, where local epoch counters in each execution thread will continue being set to the incremented global epoch counter value.

At block 560, if the difference between the current global epoch counter and the recorded global epoch counter is greater than a threshold amount, then method 500 determines at block 570 that all execution threads are using both the current and the target data access synchronization strategies to access data structure 110.

In some embodiments, the threshold amount is 2. The threshold operates to define a so-called "grace period" during which sufficient time and processing cycles are allocated to allow data structure 110 to be accessed using both the current and target data access synchronization strategies. In this manner, it can be ensured that all execution threads which might need to access data structure 110 using the current data access synchronization strategy are able to do so prior to the execution threads switching exclusively to the target data access synchronization strategy for accessing data structure 110.

Some embodiments described herein may offer numerous improvements in the performance of computing system 100. Dynamically switching from one data access synchronization strategy to another at run-time allows computing system 100 to access data structure 110 in the most efficient manner possible for given workload characteristics and current operating environment. This may result in, for example, a greater number of operations per second being performed on data structure 110. A person skilled in the art will appreciate that data structures 110 in computing system 100 play a significant role in determining the performance of execution threads and critical software functions for software applications 108, including but not limited to operating systems, databases, and key-value stores. Moreover, data access performance may translate to user-perceived performance for software application 108.

Embodiments described herein may be applied to facilitate efficient performance of complex operations. For example, when data structure 110 is a hash table, certain operations, including re-sizing of the hash table, are exceedingly difficult and computationally complex to perform when using a lock-free data access synchronization strategy. Contrastingly, the re-sizing of a hash table data structure 110 is relatively straightforward when using a lock-based data access synchronization strategy.

Figure 6:
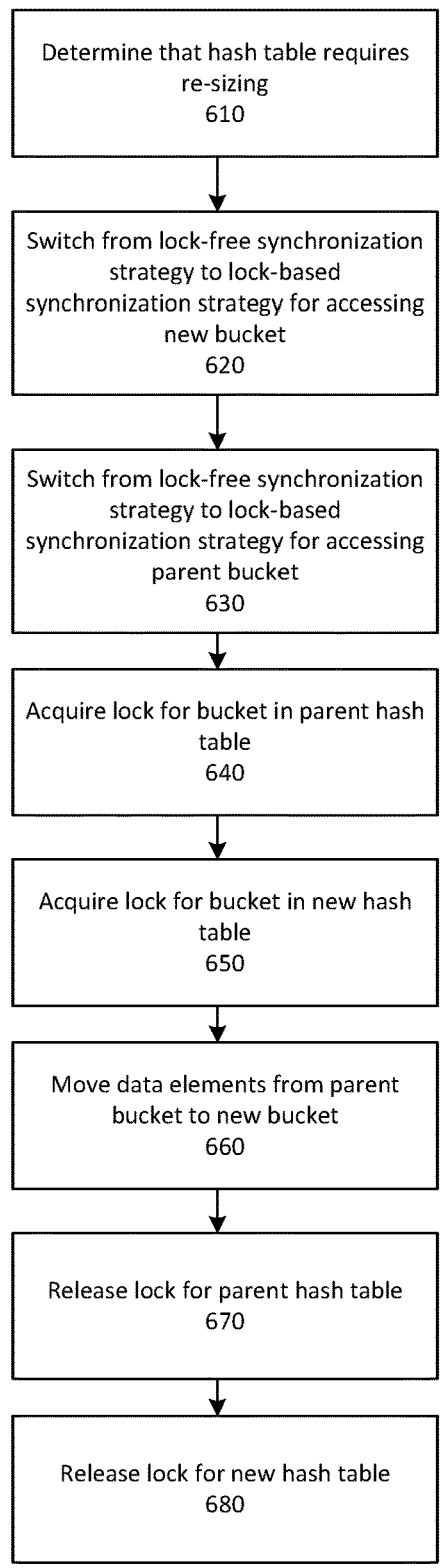
FIG. 6 is a flowchart depicting an example method of re-sizing a hash table data structure by temporarily switching from a lock-fee data access synchronization strategy to a lock-based data access synchronization strategy.

FIG. 6 is a flowchart depicting an example method 600 of re-sizing a hash by temporarily switching or changing from a lock-fee data access synchronization strategy to a lock-based data access synchronization strategy in accordance with an embodiment. The hash table is a data structure can be either expanded or reduced in size (i.e. shrunk). As described herein, the original hash table is referred to as the parent hash table, and the re-sized hash table is referred to as the new hash table. Method 600 may be carried out by software (e.g. a software program) executed, for example, by processor 102 of computing system 100. Coding of software for carrying out method 200 is within the scope of a person skilled in the art given the present disclosure. Computer-readable code or instructions executable by processor 102 of computing system 100 to perform or carry out method 200 may be stored in a non-transitory computer-readable storage medium, device, or apparatus, such as for example memory 104.

It is to be emphasized that method 600 need not be performed in the exact sequence as shown, unless otherwise indicated; and likewise various blocks may be performed in parallel rather than in sequence; hence the elements of method 600 are referred to herein as "blocks" rather than "steps".

At block 610, method 600 determines that the parent hash table requires re-sizing. The parent hash table may require re-sizing in order to improve the performance of the parent hash table. For example, the size of the parent hash table may be increased if the parent hash table becomes filled beyond a threshold load factor. Likewise, the parent hash table may be shrunk if the parent hash table contains too few data items.

At block 620, method 600 switches or changes from a lock-free data access synchronization strategy to a lock-based data access synchronization strategy for accessing the new hash table (e.g. the re-sized hash table). The switching or changing may be performed in accordance with the systems and methods described herein, where the current data access synchronization strategy is a lock-free strategy, and the target data access synchronization strategy is a lock-based strategy.

At block 630, method 600 switches or changes from a lock-free data access synchronization strategy to a lock-based data access synchronization strategy for accessing the parent hash table. The switching or changing may be performed in accordance with methods 300, 400 described herein.

At block 640, once all execution threads which access the hash table data structure are using only lock-based data access synchronization strategies, a lock is acquired for a bucket in the parent hash table. At block 650, a lock is acquired for a bucket in the new hash table. At block 660, elements from the bucket in the parent hash table are moved to a bucket in the new hash table. This is performed for each bucket in the parent hash table. When block 660 is complete, new hash table will have been created. At block 670, the lock for the parent hash table is released. At block 680, the lock for the new hash table is released.

It will be appreciated that method 600 describes re-sizing a parent hash table to a new, different hash table. However, in some embodiments, the new hash table is the same as the parent hash table. In these embodiments, elements of the parent hash table are reshuffled between buckets of the parent hash table.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufactures, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufactures, compositions of matter, means, methods, or steps.

As can be understood, the detailed embodiments described above and illustrated are intended to be examples only. Variations, alternative configurations, alternative components and modifications may be made to these example embodiments. The invention is defined by the claims.

What is claimed is:

1. A method of switching a data access synchronization strategy for a data structure stored in a memory of a computing system, the method comprising:
   monitoring, by one or more processors of the computing system, workload characteristics of one or more threads of execution accessing the data structure;
   determining, by the one or more processors of the computing system, a target data access synchronization strategy for the data structure based on the workload characteristics; and
   after determining that a current data access synchronization strategy for the data structure is different than the target data access synchronization strategy, switching, by the one or more processors of the computing system, the current data access synchronization strategy for the data structure to the target data access synchronization strategy, wherein the switching comprises:
   assigning, to each thread of execution, a local epoch counter;
   recording a value of a global epoch counter;
   assigning, for the each thread of execution, the recorded value of the global epoch counter to the local epoch counter at time of each access of the data structure by the each thread of execution;
   for the each thread of execution accessing the data structure, determining whether a value of the local epoch counter associated with all of the one or more threads of execution equals the value of the global epoch counter;
   after determining that values of all local epoch counters associated with threads of execution accessing the data structure are equal to a current value of the global epoch counter, incrementing the value of the global epoch counter;
   determining whether a difference between the value of the global epoch counter and the recorded value of the global epoch counter is greater than a threshold; and
   after determining that the difference between the value of the global epoch counter and the recorded value of the global epoch counter is greater than the threshold, determining that all of the one or more threads of execution are accessing the data structure using both the target data access synchronization strategy and the current data access synchronization strategy.

2. The method of claim 1, wherein switching comprises: notifying all of the one or more threads of execution to access the data structure using both the target data access synchronization strategy and the current data access synchronization strategy; and after determining that all of the one or more threads of execution are accessing the data structure using both the target data access synchronization strategy and the current data access synchronization strategy, notifying, by computing system, all of the one or more threads of execution to access the data structure using only the target data access synchronization strategy.

3. The method of claim 2, wherein the determining that all of the one or more threads of execution are accessing the data structure using both the target data access synchronization strategy and the current data access synchronization strategy comprises: during a current epoch, determining, for a previous epoch, whether any one of the one or more threads of execution are accessing the data structure using only the current data access synchronization strategy; and after determining, for the previous epoch, that none of the one or more threads of execution are accessing the data structure using only the current data access synchronization strategy, determining that all of the one or more threads of execution are accessing the data structure using both the target data access synchronization strategy and the current data access synchronization strategy.

4. The method of claim 1, wherein the data structure is a hash table, a linked list, a queue, a search tree, a B-tree, or a skip list.

5. The method of claim 1, wherein the workload characteristics include at least one of a frequency of accesses to the data structure, a ratio of read-only to write accesses to the data structure, a number of elements in a working data set, or a number of data items in the data structure.

6. The method of claim 1, wherein determining the target data access synchronization strategy is further based on an operation to be performed on the data structure.

7. The method of claim 6, wherein the data structure is a hash table, and wherein the operation to be performed on the data structure is a resizing of the hash table.

8. The method of claim 1, wherein the workload characteristics include a frequency of accesses to the data structure, a ratio of read-only to write accesses to the data structure, a number of elements in a working data set, and a number of data items in the data structure.

9. The method of claim 1, the switching comprising: switching, at run time, the current data access synchronization strategy for the data structure to the target data access synchronization strategy, wherein the current data access synchronization strategy is a lock-free strategy and the target data access synchronization strategy is a lock-based strategy, or wherein the current data access synchronization strategy is the lock-based strategy and the target data access synchronization strategy is the lock-free strategy.

10. A computing system comprising: a processor; a memory storing computer-readable instructions, which when executed by the processor, cause the computing system to:
    monitor workload characteristics of one or more threads of execution accessing a data structure;
    determine a target data access synchronization strategy for the data structure based on the workload characteristics; and
    after determining that a current data access synchronization strategy for the data structure is different than the target data access synchronization strategy, switch, the current data access synchronization strategy to the target data access synchronization strategy, wherein switching of the current data access synchronization strategy comprises:
assigning, to each thread of execution, a local epoch counter;
recording a value of a global epoch counter;
assigning, for the each thread of execution, the recorded value of the global epoch counter to the local epoch counter at time of each access of the data structure by the each thread of execution;
for the each thread of execution accessing the data structure, determining whether a value of the local epoch counter associated with all of the one or more threads of execution equals the value of the global epoch counter;
after determining that values of all local epoch counters associated with threads of execution accessing the data structure are equal to a current value of the global epoch counter, incrementing the value of the global epoch counter;
determining whether a difference between the value of the global epoch counter and the recorded value of the global epoch counter is greater than a threshold; and
after determining that the difference between the value of the global epoch counter and the recorded value of the global epoch counter is greater than the threshold, determining that all of the one or more threads of execution are accessing the data structure using both the target data access synchronization strategy and the current data access synchronization strategy.

11. The computing system of claim 10, wherein the computer-readable instructions further cause the computing system to notify all of the one or more threads of execution to access the data structure using both the target data access synchronization strategy and the current data access synchronization strategy; and after determining that all of the one or more threads of execution are accessing the data structure using both the target data access synchronization strategy and the current data access synchronization strategy, notify all of the one or more threads of execution to access the data structure using only the target data access synchronization strategy.

12. The computing system of claim 11, wherein the determining that all of the one or more threads of execution are accessing the data structure using both the target data access synchronization strategy and the current data access synchronization strategy comprises: during a current epoch, determining, for a previous epoch, whether any one of the one or more threads of execution are accessing the data structure using only the current data access synchronization strategy; and after determining, for the previous epoch, that none of the one or more threads of execution are accessing the data structure using only the current data access synchronization strategy, determining that all of the one or more threads of execution are accessing the data structure using both the target data access synchronization strategy and the current data access synchronization strategy.

13. The computing system of claim 11, wherein the data structure is a hash table, a queue, a search tree, a linked list, a B-tree, or a skip list.

14. The computing system of claim 11, wherein the workload characteristics include at least one of a frequency of accesses to the data structure, a ratio of read-only to write accesses to the data structure, a number of elements in a working data set, or a number of data items in the data structure.

15. The computing system of claim 11, wherein the computer readable instructions, when executed by the processor, cause the computing system to determine the target data access synchronization strategy based on an operation to be performed on the data structure.

16. The computing system of claim 10, wherein the computer-readable instructions, when executed by the processor, cause the computing system to switch the current data access synchronization strategy to the target data access synchronization strategy by: switching, at run time, the current data access synchronization strategy for the data structure to the target data access synchronization strategy, wherein the current data access synchronization strategy is a lock-free strategy and the target data access synchronization strategy is a lock-based strategy, or wherein the current data access synchronization strategy is the lock-based strategy and the target data access synchronization strategy is the lock-free strategy.

17. A non-transitory computer-readable medium storing computer-readable instructions, which when executed by a processor of a computing system, cause the computing system to perform operations, the operations comprising:
monitoring workload characteristics of one or more threads of execution accessing a data structure;
determining a target data access synchronization strategy for the data structure based on the workload characteristics; and
after determining that a current data access synchronization strategy for the data structure is different than the target data access synchronization strategy, switching, at runtime, the current data access synchronization strategy to the target data access synchronization strategy, wherein the switching comprises:
assigning, to each thread of execution, a local epoch counter;
recording a value of a global epoch counter;
assigning, for the each thread of execution, the recorded value of the global epoch counter to the local epoch counter at time of each access of the data structure by the each thread of execution;
for the each thread of execution accessing the data structure, determining whether a value of the local epoch counter associated with all of the one or more threads of execution equals a value of the global epoch counter;
after determining that values of all local epoch counters associated with threads of execution accessing the data structure are equal to a current value of the global epoch counter, incrementing the value of the global epoch counter;
determining whether a difference between the value of the global epoch counter and the recorded value of the global epoch counter is greater than a threshold; and
after determining that the difference between the value of the global epoch counter and the recorded value of the global epoch counter is greater than the threshold, determining that all of the one or more threads of execution are accessing the data structure using both the target data access synchronization strategy and the current data access synchronization strategy.

18. The non-transitory computer-readable medium of claim 17, the switching comprising: switching, at run time, the current data access synchronization strategy for the data structure to the target data access synchronization strategy, wherein the current data access synchronization strategy is a lock-free strategy and the target data access synchronization strategy is a lock-based strategy, or wherein the current data access synchronization strategy is the lock-based strategy and the target data access synchronization strategy is the lock-free strategy.

* * * * *